July 9, 1968 H. H. APPLEBY 3,391,604
STABILIZING ADAPTER AND VALVE SEAT DEPTH REGULATOR
Filed Feb. 21, 1966 2 Sheets-Sheet 2
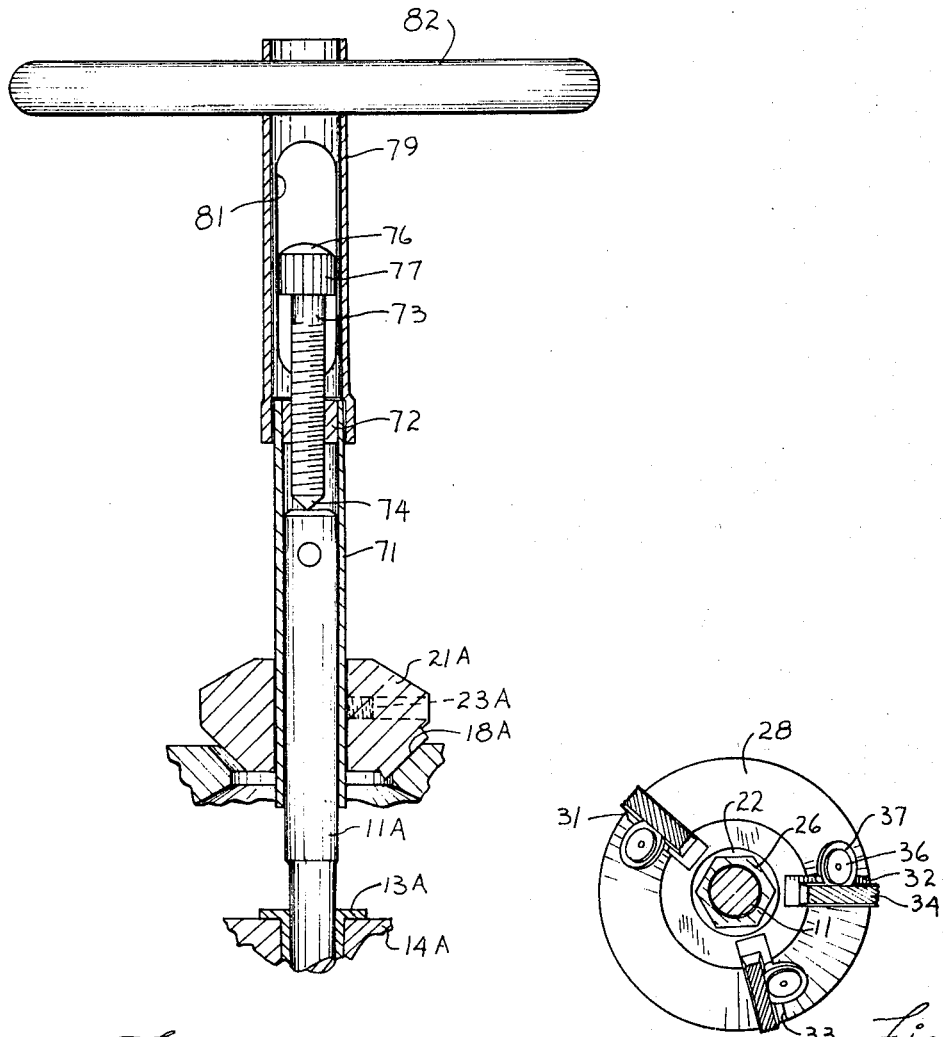
INVENTOR
HENRY H. APPLEBY
BY
ATTORNEYS

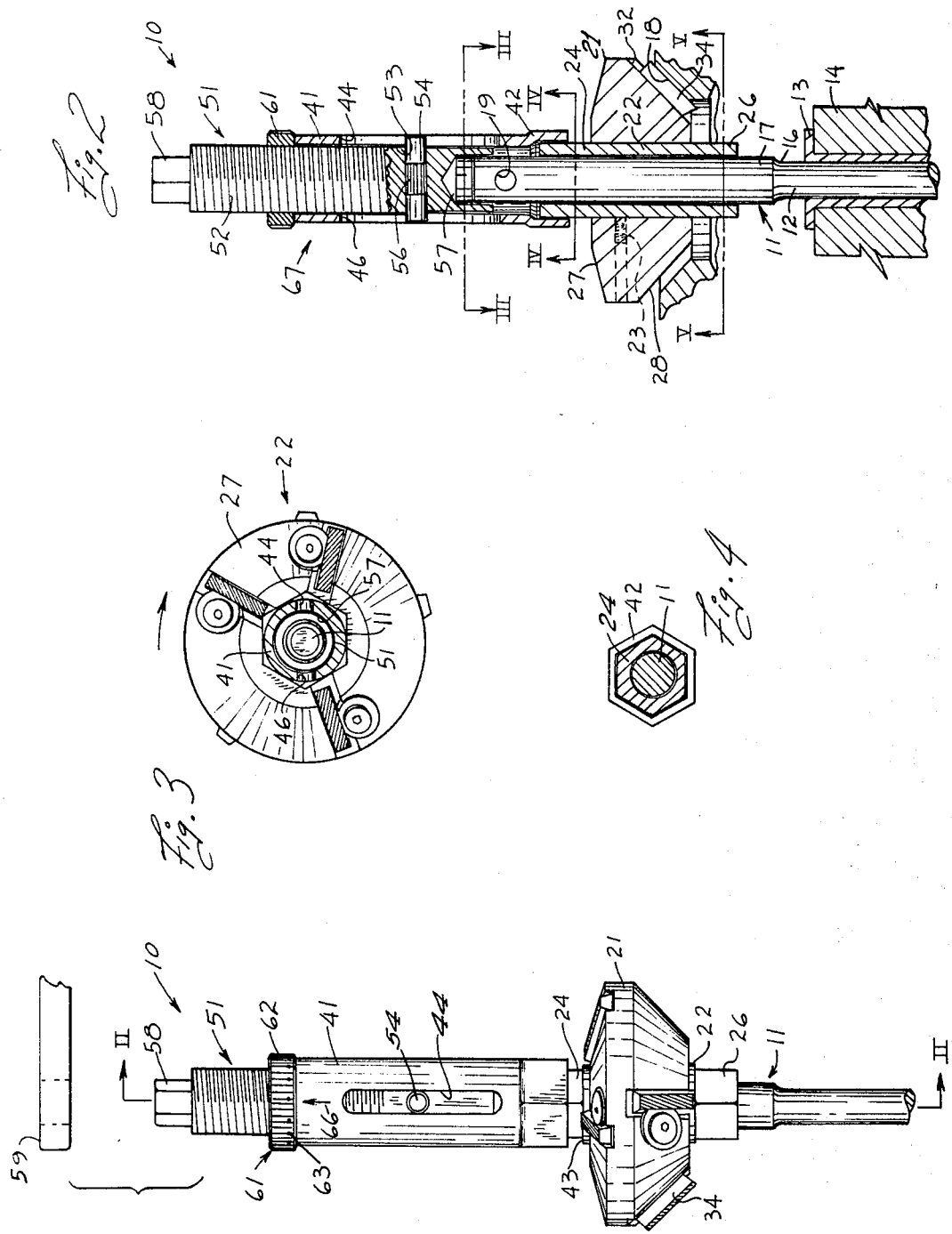

United States Patent Office 3,391,604
Patented July 9, 1968

3,391,604
STABILIZING ADAPTER AND VALVE SEAT
DEPTH REGULATOR
Henry H. Appleby, Corunna, Mich., assignor to Neway
Sales, Inc., Corunna, Mich., a corporation of Michigan
Filed Feb. 21, 1966, Ser. No. 529,029
6 Claims. (Cl. 90—12.5)

ABSTRACT OF THE DISCLOSURE

A valve seat cutter having an elongated pilot rod loosely receivable through the valve seat and snugly receivable in the valve guide associated therewith. A cutter head having a coaxial hub is slideably received over the pilot rod. A hollow socket member fits over the free end of the hub and is engageable therewith for urging the cutter head axially against the valve seat and for rotating same. An externally threaded member extends into the end of the hollow socket member and can be adjusted to vary the distance through which the cutting head can move axially of the pilot rod into the valve seat area.

---

This invention relates to apparatus for renewing valve seats for poppet valves in automotive engines and more particularly relates to apparatus having a stabilizing adapter and a valve seat depth regulator.

There has been and is currently a substantial demand among automotive servicemen and the like for an inexpensive compact and hand held tool, either hand operated or power operated, capable of accurately and smoothly refinishing valve seats for poppet valves. Prior attempts to meet this demand have generally not been completely satisfactory. Among these is the renewal of valve seats by lapping a newly ground poppet valve therein using lapping compound. This approach has been generally unsatisfactory since it will not in a practical period of time correct an eccentric valve seat which in turn may tend to cock the valve in its guide.

Grinding, on the other hand, is relatively expensive since the surface of the stone must be frequently dressed to remove the pattern imbedded therein by a distorted seat.

On the other hand, a device which has been found quite successful in restoring valve seats provides a circular head which carries a plurality of radial cutter bars of carboloy or the like angled to correspond to the desired angle of the valve seat. With such a device, the valve seat is quickly renewed by cutting away any surface irregularities successive seats being cut to the same angle and contour due to the persistent sharpness of the carboloy cutters.

However, it has been found, particularly with highly distorted valve seats or valve seats which have worn eccentrically of the valve stem axis that means for centering the cutting head and for maintaining same on a fixed rotational axis would be desirable. It has been further found in hand cutting valve seats that some of the seats may be cut more deeply than others since it has been impossible even for an experienced mechanic to judge by eye whether the depth of cut on different valve seats is within several thousandths of an inch. It is particularly desirable on the multicylinder engines to remove the same amount of material from each of the seats so that removal of the same amount of material from the stem ends of identically ground valves will assure that the resulting valve clearances will be substantially the same for all the valves. It has further been found that such a sharp and fast cutting tool may dig into or gouge the relatively soft valve seat and after so doing, it is almost impossible to remove the high spots left as a result.

As a result, it is an object of this invention to provide apparatus for renewing valve seats for poppet valves including means for stabilizing the rotation of the seat cutting head and for regulating with high precision the depth of cut.

A further object of this invention is to provide an apparatus, as aforesaid, in which the valve seat cutting head is held rigidly coaxially with the valve guide associated with the valve seat with a high degree of precision during cutting and which is capable of renewing even badly distorted valve seats and restoring same to circularity and concentricity with the valve guide.

A further object of this invention is to provide an apparatus, as aforesaid, in which the cutting head is rigidly prevented from tipping off the axis of the valve guide even when one of its cutters passes over a depression in the valve seat, which maintains the desired angle between and linear shape of diametrically opposed elements of the valve seat and which prevents gouging of the valve seat or cocking of the axis of the valve seat with respect to the axis of the valve guide during cutting.

A further object of this invention is to provide an apparatus, as aforesaid, in which the depth of cut is selectable by the operator by a readily and quickly carried out adjustment of the apparatus, in which the depth of cut can be varied continuously over a relatively wide range, such range being substantially greater than would normally be required in common use, in which the depth of cut can be precisely set at the same depth time after time and in which the depth of cut remains fixed over long periods of use until manually reset.

A further object of this inveniton is to provide apparatus, as aforesaid, in which the depth of cut adjustment is independent of the axial position of the means supporting the head for rotation with respect to the seat so that the depth of cut adjustment is independent of the physical characteristics of the engine block or engine head bearing the valve seat and in which successive valve seats may readily be cut with the same depth of material being removed therefrom.

A further object of this invention is to provide an apparatus, as aforesaid, which can be used with a wide variety of engines and other mechanisms employing poppet valves and for widely differing seat diameters and angles and in which the distance from the valve guide to the valve seat may vary widely without interference with the proper operation of the apparatus.

A further object of this invention is to provide an apparatus as aforesaid, which has relatively few parts and in which the parts are relatively simple in configuration and are inexpensively and readily manufacturable in large or small quantities with standard machine tools.

A further object of this invention is to provide an apparatus, as aforesaid, which can be sturdily constructed, which will be capable of a long, substantially trouble-free operating life under conditions of hard usage with little or no maintenance, which is readily repairable by the user and which is capable of producing satisfactory results when driven either by hand or by a suitable motor.

Other objects and purposes of this invention will be apparent to persons acquainted with apparatus of this general type upon reading the following description and inspecting the accompanying drawings.

In the drawings:

FIGURE 1 is a fragmentary elevational view of the apparatus embodying the invention.

FIGURE 2 is a sectional view taken along the line II—II of FIGURE 1.

FIGURE 3 is a sectional view taken along the line III—III of FIGURE 2.

FIGURE 4 is a sectional view taken along the line IV—IV of FIGURE 2.

FIGURE 5 is a sectional view taken along the line V—V of FIGURE 2.

FIGURE 6 is a central cross-sectional view similar to FIGURE 2 and disclosing a modification.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from the geometric center of the device and designated parts thereof. Said terminology will include the words above specifically mentioned, derivatives thereof and words of similar import.

GENERAL DESCRIPTION

In general, the objects and purposes of the invention are met by providing a valve seat cutter construction for refinishing the annular valve seat of a poppet valve which includes an elongated pilot rod loosely receivable through the valve seat and snugly receivable in the valve guide associated therewith. A cutter head has a coaxial hub snugly receivable over the free end of the pilot and slideable therealong, the pilot supporting the cutting head for rotation coaxially of the valve guide. The cutter head has a plurality of cutters engageable with the valve seat for removing material therefrom upon rotation of the cutting head. A hollow socket member fits over the free end of the hub and is engageable therewith for urging the cutter head axially against the valve seat and for rotating said cutter head. An elongated, externally threaded member is loosely telescoped within the socket member and is disposed coaxially of the free end of the pilot. The externally threaded member extends through an internally threaded collar which is limited by engagement with one of the socket members and hug against movement toward the cutting head. Relative threaded adjustment between the collar and externally threaded member determines the distance through which the cutting head can move axially of the pilot into the valve seat area. Thus, the depth of cut is limited by engagement of the externally threaded member with the opposed end of the pilot.

DETAILED DESCRIPTION

Turning now to FIGURES 1 and 2, the valve seat cutter construction 10 embodying the invention comprises an elongated circular pilot rod 11. The lower end 12 of the pilot rod 11 is of reduced diameter and preferably cylindrical and is arranged to slideably fit within the valve guide 13 of an automotive engine, a fragment of which is indicated at 14, or other mechanism using a poppet-type valve. Downward movement of the lower end 12 of the pilot rod 11 into the valve guide 13 may be limited by any convenient means such as by slightly tapering the lower end 12, the tapered end being driven into the guide until it is firmly in place. Alternatively, the pilot may be made with an expandable pilot, not shown. Such as expandable pilot is placed into the valve guide and expanded until it holds firmly. The diameter of the upper end portion 17 is substantially less than that of the valve seat 18. A diametrical opening 19 is preferably provided through the upper end of the pilot rod 11 to facilitate removal of the pilot 11 from the valve guide 13 after the valve seat 18 has been cut.

A cutter head 21, generally cylindrical in shape, is provided with an elongated coaxial hub 22 to which it is fixed by a radial set screw indicated in broken lines at 23. The hub 22 is snugly but slideably telescopable over the upper end portion 17 of the pilot rod 11. The end portions 24 and 26 of the hub 22, which extend axially beyond the cutter head 21, are arranged to be rotatably driven by means hereinafter described. Thus, in the particular embodiment shown, the end portions 24 and 26 are of hexagonal cross section. The cutter head 21 and hub 22 are preferably identical to those disclosed in my copending application Ser. No. 529,047, now Patent No. 3,354,528. Briefly, however, the particular cutter head 21 disclosed has frusto-conical ends 27 and 28, the solid angle defined by each of said frusto-conical ends corresponding to the solid angle defined by the particular valve seats upon which they are intended to act. The frusto-conical ends 27 and 28 here illustrated make 75 degree and 45 degree angles, respectively, with the axis of the hub 22 although any desired angles may be employed. Except for the difference in angle, the frusto-conical ends 27 and 28 are preferably similar and hence only one thereof will be described.

Considering the lower end 28 (FIGURE 5) in more detail, a plurality, preferably three, of circumferentially spaced grooves 31, 32 and 33 extend radially from adjacent the hub 22 at a substantially constant depth along the frusto-conical face 28. A cutter bar 34 is disposed in each of the grooves 31, 32 and 33, the outer face of such cutter bars being provided with successive spaced rows of elongated cutting teeth in a manner similar to a file. The cutter head 21 shown is arranged for clockwise rotation during cutting as seen from the upper end thereof, that is, the end away from the valve seat to be cut. The cutter bars 34 about the trailing side of the grooves 32 and are held thereagainst by screws 36 and thrust washers 37.

An elongated hollow socket member 41 is generally cylindrical in shape and is provided with a hexagonally formed portion or socket 42 at the lower end thereof which is adapted for snugly sliding over the upper hexagonal end 24 of the hub 22 as shown in FIGURES 1 and 2. Although the socket member 41 is shown only partially telescoped over the end portion 24 it will be understood that when cutting, the lower end of the socket member 41 is axially urged against the upwardly facing, chordally located shoulders 43 on the hub defined between the central circular portion of the hub and the hexagonal end portion 24. It is through the socket member 41 that the operator urges the cutters 34 against the valve seat and moves same rotatably therealong, the hexagonal configuration of the end portion 24 and the socket 42 preventing circumferential slippage therebetween. The socket member 41 is provided with diametrally opposed, axially extending slots 44 and 46 intermediate the ends thereof.

An elongated externally threaded member or screw 51 is snugly but slideably receivable within the upper end of the socket member 41. At least the upper portion 52 of the screw 51 is threaded. A diametral opening 53 extends through the screw 51 at a point above the lower end thereof. A pin 54 is press fitted in the opening 53 and extends beyond the perimeter of the screw 51 sufficiently to engage the slots 44 and 46 in the socket member 41. Such interengagement of the pin 54 with the slots 44 and 46 prevents circumferential movement between the screw 51 and socket member 41 and allows axial movement therebetween to an extent corresponding to the length of the slots 44 and 46. In the particular embodiment shown, the central portion 56 of the pin 54 is axially knurled to assist in maintaining the pin 54 in its desired position. The pin 54 may, however, be disloged from the opening 53 with a punch or the like should it be desired to remove the screw 51 from the socket member 41.

The lower end of the screw 51 is provided with a downwardly opening, central circular recess 57 which is coaxially aligned with and snugly but slideably arranged for telescoping over the upper end of the pilot 11, interference of the closed end of the recess 57 and the upper end of the pilot 11 preventing further downward movement of the screw 51 with respect to the pilot 11. The upper end of the screw 51 is preferably provided with a hexagonal head portion 58 for engagement with and rotation by any convenient means such as a wrench schematically indicated at 59 in FIGURE 1.

An internally threaded collar 61 is threaded on the screw 51 and is adapted for axially engaging the upper end of the socket member 41 and for thereby preventing downward axial movement of the screw 51 into the socket member 41. The periphery of the collar 61 is preferably knurled as indicated at 62 to allow for manual gripping and circumferential adjustment thereof on the screw 51.

The periphery of the collar 61 is preferably also provided with evenly spaced indicia of any convenient type, for example, suitable punch marks 63 or the like opposed to a fixed reference mark 66, on the periphery of the socket member 41, for indicating the extent of rotation of the collar 61 on the screw 51 and, hence, with respect to the socket member 41 and thereby to indicate the resulting amount of axial shifting of the screw 51 along the axis of the socket member 41.

OPERATION

Although the operation of the cutter construction 10 has been indicated somewhat above, same will be now summarized to assure a complete understanding of the invention.

To refinish a valve seat 18, the lower end 12 of the pilot 11 is first inserted into the valve guide 13 until positively stopped by any convenient means including, for example, interference between the guide and a taper on the pilot rod. With the pilot thus firmly supported and seated in the valve guide, the upper end 17 thereof extends upwardly and beyond the valve seat. Thereafter, the head 21, with the hub 22 firmly affixed thereto by means of the setscrew, 23, is slid over the upper end of the pilot 11 and downwardly therealong until the downwardly facing cutters 34 thereof contact the valve seat. At such position the upper end of the pilot 11 extends upwardly beyond the upper end of the hub.

Thereafter, the driving structure generally indicated at 67 and including the socket member 41, the screw 51 and the collar 61 assembled as generally shown in FIGURE 2 is coaxially aligned with a pilot 11 and moved downwardly thereonto, the hexagonal lower end 42 of the socket member 41 sliding downwardly over and engaging the hexagonal portion 24 of the hub 22 and coming to rest on the shoulder 43 thereof. Assuming relative positions of the screw and socket member shown, the recess 57 in the lower end of the screw simultaneously receives the upper end of the pilot 11 therewithin. Thereafter, the collar 61 is rotated to allow the screw 51 to move downwardly until the end of the recess 57 rests upon the upper end of the pilot 11. At this point, the apparatus 10 is fixed for a zero depth of cut, that is, rotation of the screw, socket member 41 and cutting head 21 will move the cutters over the face of the valve seat but would not cut into a new or properly renewed valve seat.

To adjust the apparatus 10 to the depth of cut desired, note is made of which of the indicia 63 is adjacent the reference mark 66. The collar 62 is then rotated in a direction to move the screw 51 upwardly thus lifiting the end of the recess 57 off the top of the pilot 11. The number of indicia passing the reference mark 66 corresponds directly to the axial depth of cut which will be permitted.

In the particular embodiment shown, one complete rotation of the collar 61 raises the screw 51 about .05 inch. Further, the indicia 63 here illustrated comprise seventeen evenly spaced marks, a rotation of the collar 61 corresponding to the spacing of an adjacent pair of such indicia moving the screw about .003 inch and hence resulting in a change in the axial depth of cut of the same amount. Conversely, to decrease the depth of cut, the collar 61 is rotated in the opposite direction so as to lower the screw 51 toward the pilot 11.

After the collar has been rotated to the desired position, the screw 51 may be rotated as by the wrench 59. Rotation of the screw causes, through the pin 54, a corresponding rotation of the socket member 41 and, hence, of the cutter head 21. This rotation plus axial pressure against the upper end of the tool 10 causes the cutters 34 to engage and to shear off succeeding surface layers of the value seat thus eliminating surface inperfections thereof. The cutting action continues until the cutter head has cut to a depth corresponding to preselected depth of cut at which time the end of the recess has dropped to contact the upper end of the pilot thereby preventing further downward movement of the cutting head 21 and further deepening of the cut.

It will be noted that identical depth of cut may be made on each of a series of valve seats simply by first adjusting the collar 61 so that the screw end rests on the pilot end after the pilot has been seated in the valve guide and then raising the screw by a rotation of the collar moving a preselected number of indicia past the reference point 66. As a result, it will be seen that the depth of cut selected does not depend upon the axial position of the upper end of the pilot with respect to the valve seat, but merely upon the initial spacing between the upper pilot end and the end of the recess 57. Thus, the pilot need not be identically axially positioned with respect to each valve seat to cut but need only be solidly fixed in position axially.

MODIFICATION

FIGURE 6 discloses a modified apparatus 70. Parts of the apparatus 70 similar to corresponding parts of the apparatus 10 above described will be referred to by the same reference numerals thereas with the suffix "A" added thereto. Turning to the apparatus 70 in detail, the pilot 11A thereof and cutter head 21A are preferably identical to the corresponding parts of the apparatus 10 above described. On the other hand, the hub 71 of the apparatus 70 is substantially longer than the hub 22 above described. The hub 71 is snugly but slideably receivable coaxially through the cutter head 21A and fixable thereto by means of said screw 23A. The upper end of the hub 71 extends well above the upper end of the pilot 11A and is provided with a coaxial plug or collar 72 affixed by any convenient means such as a press fit or welding within the upper end of the hub 71. The collar 72 is internally threaded coaxially of the hub 71 for threadably receiving a screw 73 also disposed coaxially of the hub. The lower end of the screw is preferably pointed as indicated at 74 for abutment against the central portion of the upper end of the pilot 11A.

Further, the screw 73 is provided with a radially enlarged head 76 at the upper end thereof, such head preferably being knurled as indicated at 77 for sure manual gripping. The upper end of the hub 71 is preferably externally hexagonally shaped as the upper end of the hub 22 above discussed.

A socket member 79 comprises an elongated member, the lower end of which preferably conforms to the contour of the upper end of the hub 71 for snugly telescoping same and for axially downwardly and rotatably urging same. The socket member 79 is loosely received over the head 76 of the screw 73 and is preferably provided with axially elongated slots 80 so that access may be had to the head of the screw 73 without removal of the socket member from the upper end of the hub 71. The socket member 79 may be rotatably driven and axially urged by any convenient means here comprising a cross bar 82 located and extending through the upper end thereof.

The operation of the apparatus 70 differs somewhat from that of the apparatus 10 above described. More particularly, after the pilot 11A has been implaced in the valve guide 13A, the hub 71 carrying screw 73 and the cutting head 21A surrounding said hub are telescoped over the upper end of the pilot 71. Thereafter, the set screw 23A is loosened to allow the cutting head 21A to rest upon the valve seat 18A and at the same time to allow the point 74 of the screw 73 to rest upon the upper end of the pilot 11A. Thereafter, the set screw 23A is tightened. At this point, the apparatus 70 is set for a zero depth of cut. To adjust the depth of cut to some preselected value, the screw 73 is threaded upwardly of the collar 72 until the point 74 thereof is spaced above the upper end of the pilot 11A a distance corresponding to the desired axial depth of cut. If desired, suitable indicia, not shown, may be provided on the screw 73 and collar 72 or the knurling on the screw head 76 and edges of the slots in the socket member 79 may be used as rotation indicators so that the operator can readily determine and repeat the amount of screw rotation. The socket member is telescoped over the screw and over the upper end of the hub 71. The operator can thereafter simultaneously rotate the socket member by means of the cross bar 82 and urge same axially toward the valve seat to drive the cutting head 21A by means of the hub 71. When the cutter head 21A has cut away the valve seat to the preset axial depth of cut, the hub and collar 71, as well as the screw 73, will have dropped sufficiently that the point 74 of the screw contacts the upper end of the pilot 11A. This prevents further downward movement of the cutter head 21A and, hence, prevents further cutting of the valve seat.

If desired, the socket member may be placed upon the upper end of the hub 71 prior to adjustment of the screw 74 and the adjustment of the screw 74 may then be carried out by manual contact of the head of the screw through the slots 81.

Although particular preferred embodiments of the invention have been described above for purposes of illustration, it is fully contemplated that modifications and variations of the invention which lie within the scope of the appended claims are fully contemplated.

The embodiments of the invention in which an exclusive property or privilege is claimed are defined as follows.

1. A valve seat cutter construction for removing the annular valve seat of a poppet valve, comprising in combination:
   pilot means fixed with respect to said valve seat and extending outwardly therethrough;
   a cutter head bearing cutting members opposed to said valve seat telescoped over said pilot means and rotatable thereabout;
   a hollow member arranged in driving relation with said cutter head and extending axially away from the valve seat, said hollow member defining an opening therein; and
   cutting depth adjustment means mounted on said hollow member, said adjustment means including an internally threaded member adjacent the hollow member and fixed thereby against movement at least axially toward said cutting head, and a screw member threadably engageable with said internally threaded member and receivable within the opening of said hollow member, said adjustment means causing movement of said screw member into contact with and away from the adjacent end of said pilot means in response to relative rotational movement between said internally threaded member and said screw member.

2. The device defined in claim 1 in which said hollow member is substantially cylindrical and is provided with a diametrically opposed pair of axially extending slots between the ends thereof, said screw member fitting snugly but slidably within the opening in said hollow member and being provided with a transverse pin engageable in said slots for preventing relative rotative movement between said hollow member and said screw member.

3. The device defined in claim 1 in which said hollow member comprises an elongated hub extending from said cutter head away from the valve seat, said sub being telescoped over said pilot means with the end thereof extending beyond the end of said pilot means, said end of said hub being provided with an internally threaded end portion comprising said internally threaded member fixed to said hub, said screw member being threadably engaged with said end portion with the lower end of said screw being positioned within said hub and adapted to contact the end of said pilot means, the other end of said screw member having a head thereon, a hollow rod substantially coaxially aligned with said hub and disposed in telescopic relationship with the head of said screw, said hollow rod having an elongated axially extending slot therein for permitting access to the head of said screw for permitting rotation thereof, one end of said rod coacting with the said end of said hub for permitting said hub to be rotatably driven by said rod, and means mounted adjacent the other end of said rod for allowing manual rotation and axial urging thereof, said screw member being rotatable so as to move same from an initial position wherein the lower end thereof contacts said pilot means in an outwardly direction away from said valve seat whereby the lower end of said screw is axially spaced from the end of said pilot means for selectively predetermining the cutting depth.

4. The device defined in claim 1 in which the opening of said hollow member is larger than the diameter of said screw member whereby said screw member is freely received therein.

5. The device defined in claim 1 in which said internally threaded member comprises a collar adapted to abut the end of the hollow member farthest from said cutter head and including means for preventing relative rotation between said screw and said hollow member whereby rotation of the collar with respect to the hollow member causes the screw to be moved axially of said pilot member so as to vary the extent to which the hollow member may be moved toward the pilot member.

6. The device defined in clam 1 in which the inner end of said screw is provided with a hollow recess into which the adjacent end of the pilot member is receivable, interference between the opposed ends of said recess and pilot member preventing further axial movement of said cutter head into said valve seat.

References Cited

UNITED STATES PATENTS

| 1,846,890 | 2/1932 | Miller | 90—12.5 |
| 1,902,207 | 3/1933 | Albertson | 90—12.5 |
| 1,962,273 | 6/1934 | Harris et al. | 90—12.5 |

LEONIDAS VLACHOS, *Primary Examiner.*